UNITED STATES PATENT OFFICE.

ALONZO FARRAR, OF BROOKLINE, MASSACHUSETTS.

IMPROVEMENT IN COMPOSITIONS FOR PRINTING OR PAINTING ON SURFACES.

Specification forming part of Letters Patent No. 113,755, dated April 18, 1871.

*To all whom it may concern:*

Be it known that I, ALONZO FARRAR, of Brookline, in the county of Norfolk and State of Massachusetts, have invented a new and useful Composition to be used for Printing or Painting on Surfaces; and I do hereby declare the same to be fully described as follows:

The first ingredient of the composition is the purified or deodorized oily residuum resulting from the purification of sulphuric acid after having been used in the refining of petroleum.

On October 26, 1869, Letters Patent No. 96,097 were granted to me for a process of utilizing the said residuum, or depriving it of its offensive odor and otherwise benefiting it, the product or oily result of the process being claimed in such patent as a new manufacture. It is this product or manufacture which enters into the present composition as its first ingredient.

In carrying out my present invention I mix with one hundred pounds of the oily product, as set forth, forty pounds of wood-charcoal (reduced to a fine or impalpable powder by being ground in a mill) and four pounds of a blue pigment, such as Prussian blue, for instance.

In the United States Patent No. 100,877, granted March 15, 1870, to me, I have described and claimed a composition made of the said oily product, lamp-black, Prussian blue, Indian red, and molasses or a saccharine sirup. I have since discovered that wood-charcoal ground to a very fine powder may be advantageously substituted for the lamp-black, that, in fact, it will effect a vast saving in expense, as the wood-charcoal costs about two cents per pound when prepared, and the lamp-black from ten to fifty cents per pound. I have also discovered that by the employment of the wood-charcoal with the Prussian blue and the oily product I am enabled to dispense with the Indian red and the molasses or saccharine sirup, thus effecting a further saving and producing a composition as advantageous for use, if not better, for some purposes, than the other.

I do not confine my invention to the precise proportions of its ingredients as heretofore stated, as they may be varied somewhat without materially changing the composition.

I do not claim the subject or subjects of the patent aforesaid; but

I claim as my present invention—

My new or improved composition, substantially as hereinabove specified.

ALONZO FARRAR.

Witnesses:
R. H. EDDY,
J. R. SNOW.